Figure 6:
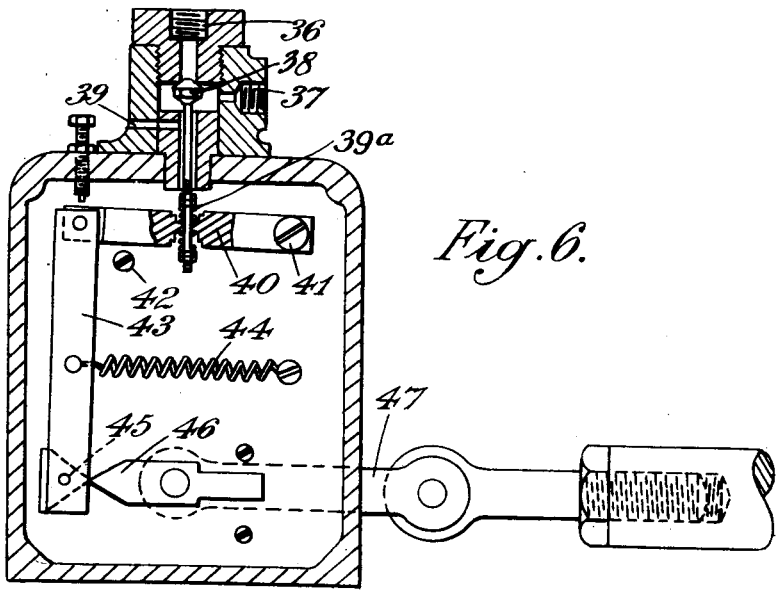

Jan. 15, 1952     T. S. MACNEISH     2,582,387
LIQUID METERING DEVICE
Filed April 28, 1947     3 Sheets-Sheet 1
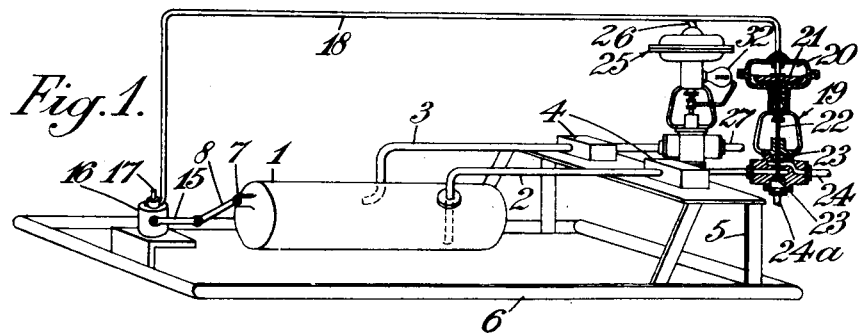
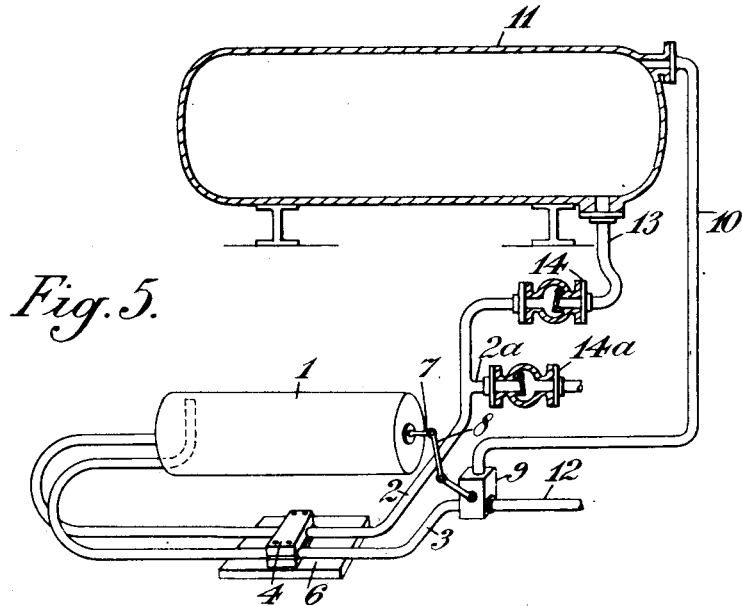
INVENTOR
T. S. MACNEISH
BY
ATTYS.

Jan. 15, 1952 T. S. MACNEISH 2,582,387
LIQUID METERING DEVICE
Filed April 28, 1947 3 Sheets-Sheet 2
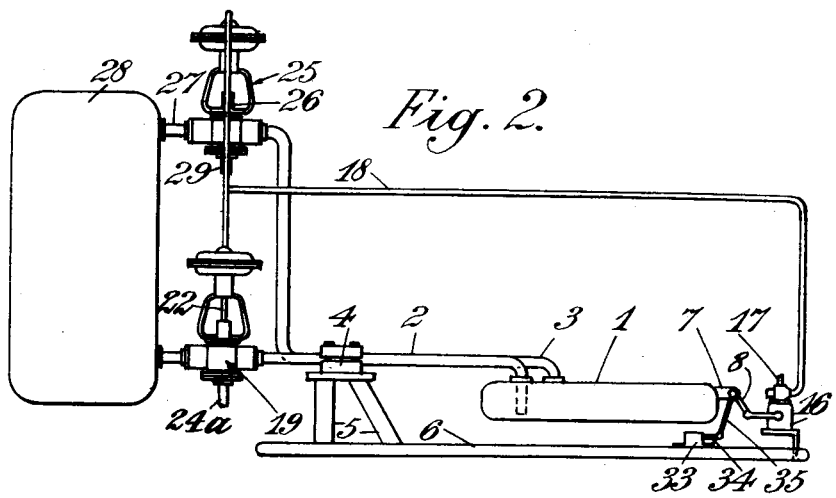
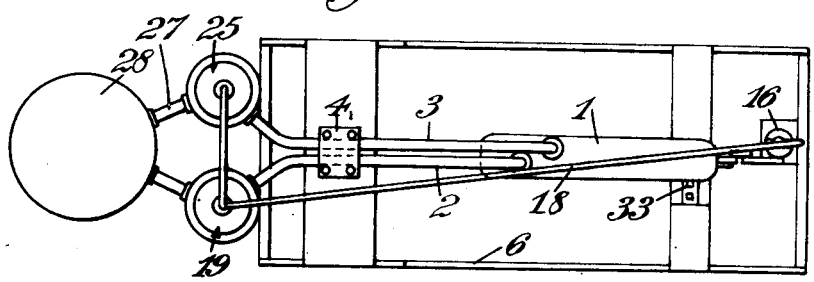
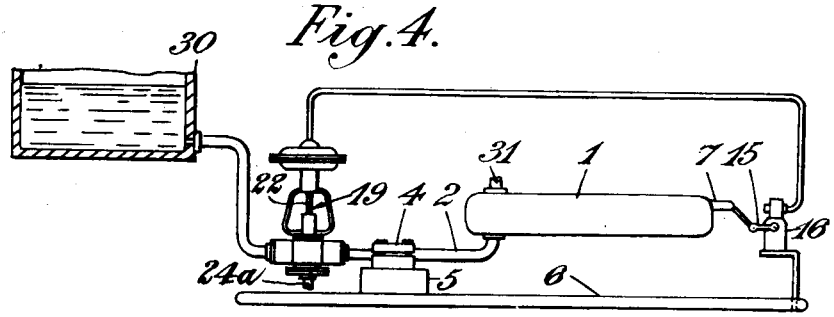
INVENTOR
T. S. MACNEISH
BY
ATTYS Jan. 15, 1952 T. S. MACNEISH 2,582,387
LIQUID METERING DEVICE
Filed April 28, 1947 3 Sheets-Sheet 3

INVENTOR
T. S. MACNEISH
BY
ATTYS

Patented Jan. 15, 1952

2,582,387

UNITED STATES PATENT OFFICE 2,582,387

LIQUID METERING DEVICE

Thomas Swan Macneish, Pointe a Pierre,
Trinidad, British West Indies

Application April 28, 1947, Serial No. 744,346
In Great Britain May 21, 1946

2 Claims. (Cl. 137—103)

This invention relates to apparatus for periodically delivering measured quantities of liquid from a vessel and in particular for metering liquids and registering or recording quantity or rate of flow of liquid from a source of supply thereof.

The invention is applicable to steam traps but is particularly concerned with apparatus for metering liquids, for instance crude oil, mineral oil fractions or the like.

The object of the invention is to provide improvements in such apparatus and more particularly to provide apparatus for the purpose in question having a frictionless and leak proof connection between a vessel functioning as a measuring vessel and the source of supply of liquid to the vessel and the delivery of liquid from the vessel.

The principle of the invention consists in the employment of a vessel which is supported cantilever-wise by a pipe serving to deliver liquid from and to the vessel and optionally in addition by a pipe adapted to supply a gas to the vessel for expelling liquid therefrom or a pipe adapted to lead liquid from the vessel so that the increase in load on the pipe or pipes due to the accumulation of liquid in the vessel, will cause its displacement subsequent upon flexure of the pipe, and applying displacement of the vessel in controlling means whereby liquid is delivered to a discharge from the vessel the pipe or pipes constituting the sole supporting means for the vessel.

Apparatus in accordance with the invention therefore comprises a vessel, at least one pipe connected with the vessel, and supporting the vessel in a cantilever fashion adapted to be flexed by the lead to the vessel and the body of liquid accumulated in it, and thereby permitting displacement of the vessel and means adapted when the displacement of the vessel has reached a predetermined limit to interrupt the supply of liquid to the vessel and effect the discharge of the body of liquid which has accumulated therein.

The means actuated by the displacement of the vessel to control the supply of liquid to and its delivery from the vessel may be a valve or valves in the supply pipe or the delivery pipe or in both such pipes.

Alternatively such means may be valves controlling the gas pressure above the body of liquid accumulating in the vessel.

Thus, the displacement of the vessel may be arranged to actuate a valve or valves controlling the supply of air or other gas under pressure to the vessel to force out its liquid contents or the exhaust of air or other gas from the vessel to promote the inlet of liquid to it and later the admission to the vessel of air or other gas under atmospheric or higher pressure to expel such liquid.

The actuation of such valves may be effected by the displacement of the vessel through a pilot, relay or servo mechanism.

Where a relay or pilot or servo means is used for actuating the valve or valves the displacement of the vessel may be arranged to operate for instance a valve by which gas under pressure is admitted to a valve construction comprising a diaphragm which in turn operates a valve element or valve elements arranged in a valve body or valve bodies connected in the pipes by which liquid may be supplied to and delivered from the vessel.

Alternatively any other form of relay mechanism may be employed for actuating the valves as the result of the displacement of the vessel, for instance electrical actuating means may be provided.

The mode of supporting the vessel so that the weight of the vessel and the increase in load due to the accumulation therein of liquid causes displacement of the vessel, is applied in causing flexure of the pipe by which liquid is supplied to the vessel and optionally also a pipe by which liquid is delivered from the vessel may be varied within wide limits.

One or both of such pipes may, for instance, be bent back on itself to provide more or less a hairpin bend or hairpin bends or, as above indicated, the vessel may be supported in cantilever fashion by pipes of other form which are engaged in a clamp adapted for adjustment for calibration purposes by varying the unsupported length of the pipe or pipes.

The device may be applied in conditions in which liquid is supplied to the vessel under atmospheric pressure or pressure above atmospheric pressure or below atmospheric pressure, and as stated, the valve mechanism may be such as to provide where necessary for the supply of gas at high or atmospheric pressure to the vessel for expelling from it the liquid collecting therein, or alternatively or in addition valve mechanism enabling a reduced pressure to be produced within the vessel to promote the flow of liquid into it.

Any appropriate form of pilot valve may be employed in accordance with the invention and, optionally, the pilot valve used is one in which motion is imparted to a cam as the result of the displacement of the vessel due to loading, the cam having steep faces and co-operating with a pointed cam follower or tappet secured to a member by which motion is imparted to the movable valve element of a pilot valve arranged to control the supply of gas under pressure to, for instance, a diaphragm or piston actuated valve or valves which controls the delivery of liquid to and from the vessel.

For instance, the pilot valve may comprise a member associated with a spring adapted to store potential energy which is applied in assisting the actuation of the pilot valve, the member being associated with a pointed cam follower co-operating with a cam having a sharp or acute apex so that substantially instantaneous displacement of the cam follower and thus of the pilot valve may be secured.

The pilot valve itself may be of the double mushroom type or may comprise a movable element of piston or any other appropriate form.

In metering the liquid, it is obviously necessary to count or record the number of times the measuring or metering vessel has been filled and emptied and for this purpose any appropriate registering or integrating means may be used. For instance, counting mechanism of any appropriate construction can be employed for this purpose, and where it is desired to determine the rate of supply or flow of liquid through the system with which the apparatus is associated, it will be necessary also to correlate such information with time.

Instead of employing counting mechanism mechanically actuated as the result of the displacement of the measuring vessel, a counting mechanism mechanically actuated by movement of the valves by which pressure within the vessel is varied to control the supply of liquid to the vessel and its discharge therefrom, may be employed.

Alternatively, there may be employed a recording pressure gauge which registers a peak or cusp as gas in introduced to force out each discharge of liquid.

In this case the records from the recording pressure gauge may be collected and interpreted by determining the number of times the vessel has been filled and discharged, multiplied by the volume of liquid discharged in each operation.

Figure 7:
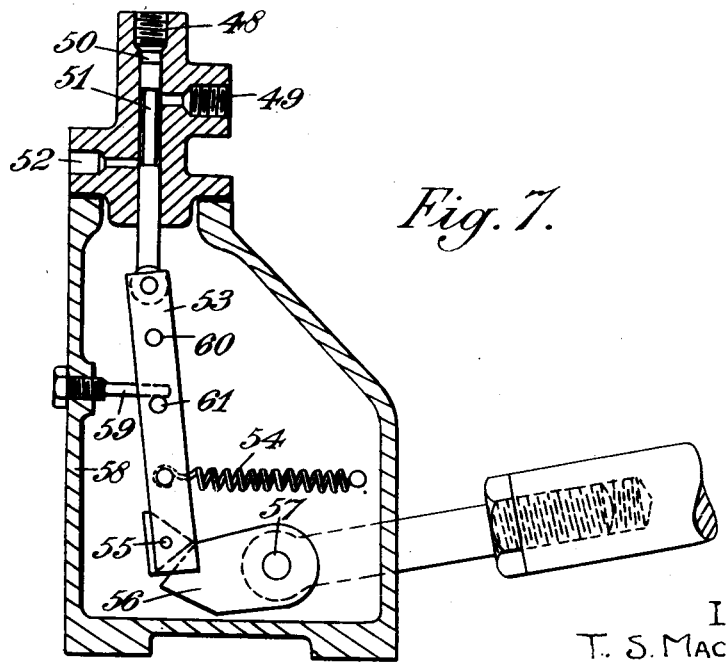

The invention will be described further in detail and by way of example with reference to the accompanying drawings, in which:

Figure 1 is a perspective view in elevation of one construction;
Figure 2 is a view in elevation, and
Figure 3 is a plan view of a second construction;
Figure 4 is a like view of a third construction;
Figure 5 is a perspective view in elevation of a fourth construction;
Figures 6 and 7 are views in sectional elevation of two constructions of pilot valve mechanism adapted for use in certain arrangements shown in the preceding figures.

In Figures 1 to 5, 1 is a vessel for periodically delivering determined quantities of liquid or in other words a measuring vessel, mounted so that the load produced by the accumulation in it of liquid is applied in deflecting a pipe 2 by which liquid is supplied to the vessel and in the case of the constructions illustrated in Figures 1, 2, 3 and 5 also a pipe 3 by way of which gas under pressure may be delivered to the vessel for expelling its contents.

In all of the constructions, one or both of these pipes is engaged in a clamp 4 on a standard or block 5 secured to a base 6 so forming the sole supporting means for the vessel.

In the case of the construction illustrated in Figure 5, the pipes 2 and 3 which form the sole supporting means for the vessel are each bent back into more or less hairpin form, one of the limbs of each of such bent portions being so secured.

In all of the constructions the vessel 1 is provided with an arm 7 which in the construction illustrated in Figure 5 is arranged in connection through a link 8 with a three-way valve 9 which is in communication with the pipe 3 and a pipe 10 leading to the head of the vessel 11 and is also in communication with a pipe 12 by way of which air or other gas or steam may be admitted to the vessel 1 to expel its contents.

The construction shown in this figure is one in which accuracy of measurement is not essential and as shown liquid is supplied from the vessel 11 to the vessel 1 by way of a pipe 13 and non-return valve 14 communicating with the pipe 2 and being expelled from the pipe 2 by way of a non-return valve 14a in the branch 2a.

In the case of the constructions illustrated in Figures 1 to 4, the arm 7 is connected by the link 8 and an arm 15 with the movable element of a three-way pilot valve 16 in communication by way of a pipe 17 with a source of compressed air or other gas or fluid under pressure and a pipe 18 with a three-way valve indicated generally by the reference 19.

This three-way valve is as shown in Figures 1 to 4 a diaphragm operated valve; a piston operated valve would, however, be equally suitable and would be less liable to failure.

As may be seen the valve comprises a chamber 20 one wall of which is constituted by a flexible diaphragm 21 to which is secured the spindle 22 of a double seated valve 23 so arranged that according to the position of the movable element of the valve communication may be established between the pipe 2 and either the pipe 24 or the pipe 24a, the one acting as the inlet pipe and the other as the outlet from the vessel 1.

In the construction illustrated in Figures 1 to 3, a second similar three-way valve 25 is provided and this is actuated by a gas or fluid under pressure, the supply of which to it to effect actuation of its diaphragm is controlled by the pilot valve 16, the pressure gas being delivered to it by way of a branch pipe 26.

In the case of the construction shown in Figure 1, this diaphragm valve controls the admission from an external source of a gas under pressure by way of an inlet pipe 27 and the pipe 3 to the vessel 1 for expelling liquid collected therein and permitting thereafter the escape of such gas from the vessel 1 so that a further quantity of liquid may collect in it.

In the constructions shown in Figures 2 and 3, the liquid is supplied from a vessel 28 in which however the liquid is under pressure above atmospheric pressure.

In this case the pressure of the atmosphere above the liquid in the vessel 28 is used for expelling the liquid collecting in the vessel 1 and to this end the three-way valve 25 is connected by a pipe 27 with the upper end of the vessel and controls communication between the pipe 3 and the pipes 27 and 29 the latter of which is open to atmosphere.

In the case of the construction illustrated in Figure 4 the liquid to be metered is supplied under atmospheric pressure from the vessel 30 through the three-way valve 19 and pipe 2 to the vessel 1 which is provided with a tubulure 31 open to atmosphere.

All of the constructions will if used for metering be provided with a counter or integrator which is indicated by the reference 32 in Figure 1 and actuated by the spindle of one of the diaphragm actuated three-way valves.

In the constructions shown in Figures 2 and 3, the counter or integrator is indicated by the reference 33 and is provided with an arm 34 connected by a link 35 with the arm 7 extending from the vessel, the purpose of the counter or integrator being to totalise the number of times the vessel 1 is filled and emptied and thereby enable the total quantity of liquid delivered to be determined.

In Figure 6 in which one form of pilot valve suitable for the purpose of the invention is illustrated, 36 is a connection with the source of supply of gas under pressure, 37 is a connection to the diaphragm valve, 38 is the movable valve element which in one position will permit communication between the connections 36 and 37, and in another position between the connection 37 and a bleed passage 39, the stem of the movable valve being engaged between springs 39a with the lever 40 pivoted at 41 and associated with a limit stop 42, the end of the lever being connected with the link 43 to which is connected a spring 44 adapted to cause the pointed tappet cam 45 to cooperate with the pointed end 46 of the lever 47 which is the equivalent of the arm 15 in certain of the preceding figures and is designed to be connected by a link equivalent to 8 with the arm 7 which is secured to the measuring vessel as shown in Figures 1, 2, 3 and 4.

The construction of pilot valve illustrated in Figure 7 comprises a gas inlet which functions as a connection 48 with which the source of supply of gas under pressure is connected and a connection 49 designed to be connected to the three-way valve which may be of the piston or diaphragm actuated type.

In the chamber 50 there is located a piston valve 51 which in one position establishes communication between the connections 48 and 49 and in another position between the connection 49 and the bleed outlet 52.

The piston valve is connected with a double link 53 which is constrained by the spring 54 to assume the position shown in the figure.

On the end of this link there is provided a pointed cam element 55 which co-operates with the pointed end of the arm 56 secured to the pivot or spindle 57 to which is in turn secured an arm equivalent to the arm 15 shown in certain of the preceding figures.

In the casing 58 in which the link 53 and certain associated parts are located, there is provided a limit stop 59 which limits the travel of the link and thus of the valve through a path the length of which is determined by the stops 60 and 61.

I claim:

1. Apparatus for periodically delivering measured quantities of liquid from a vessel and in particular for metering liquids, comprising a vessel, a pipe connected with the vessel and functioning as a cantilever support for it, adapted to be flexed by the load of the vessel and the body of liquid accumulating therein, and thereby permitting displacement of the vessel, and valve means operatively connected with the vessel adapted by the displacement thereof to interrupt the supply of liquid to the vessel and effect the discharge of the body of liquid which has accumulated therein.

2. Apparatus for periodically delivering measured quantities of liquid from a vessel and in particular for metering liquids, comprising a vessel, a pipe connected with the vessel and functioning as a cantilever support for it, adapted to be flexed by the load of the vessel and the body of liquid accumulating therein, and thereby permitting displacement of the vessel, a mechanical connection between the vessel and a relay adapted to actuate valve means to interrupt the supply of liquid to the vessel and effect the discharge of the body of liquid which has accumulated therein.

THOMAS SWAN MACNEISH.

REFERENCES CITED

The following references are of record in the file of this patent:

UNITED STATES PATENTS

| Number | Name | Date |
|---|---|---|
| 8,088 | Faber | May 13, 1851 |
| 1,114,141 | Houser | Oct. 20, 1914 |
| 1,575,816 | Carlstedt | Mar. 9, 1926 |
| 1,992,991 | Colley | Mar. 5, 1935 |
| 2,273,180 | De Castro | Feb. 17, 1942 |
| 2,432,039 | Plank | Dec. 2, 1947 |

FOREIGN PATENTS

| Number | Country | Date |
|---|---|---|
| 13,551 | The Netherlands | Oct. 15, 1925 |
| 379,937 | France | Sept. 23, 1907 |